United States Patent
Wang et al.

(10) Patent No.: US 11,366,534 B2
(45) Date of Patent: Jun. 21, 2022

(54) TOUCH SUBSTRATE AND MANUFACTURING METHOD THEREOF, IN-CELL TOUCH PANEL

(71) Applicants: BOE TECHNOLOGY GROUP CO., LTD., Beijing (CN); ORDOS YUANSHENG OPTOELECTRONICS CO., LTD., Inner Mongolia (CN)

(72) Inventors: Zifeng Wang, Beijing (CN); Fengguo Wang, Beijing (CN); Dawei Shi, Beijing (CN); Bo Ma, Beijing (CN); Hong Liu, Beijing (CN); Xinguo Wu, Beijing (CN); Wentao Wang, Beijing (CN); Lina Wang, Beijing (CN)

(73) Assignees: BOE TECHNOLOGY GROUP CO., LTD., Beijing (CN); ORDOS YUANSHENG OPTOELECTRONICS CO., LTD., Inner Mongolia (CN)

( * ) Notice: Subject to any disclaimer, the term of this patent is extended or adjusted under 35 U.S.C. 154(b) by 762 days.

(21) Appl. No.: 16/300,411

(22) PCT Filed: Mar. 5, 2018

(86) PCT No.: PCT/CN2018/078026
§ 371 (c)(1),
(2) Date: Nov. 9, 2018

(87) PCT Pub. No.: WO2019/007090
PCT Pub. Date: Jan. 10, 2019

(65) Prior Publication Data
US 2021/0223893 A1    Jul. 22, 2021

(30) Foreign Application Priority Data

Jul. 3, 2017 (CN) .......................... 201720796916.1

(51) Int. Cl.
*G06F 3/041* (2006.01)
*G06F 3/044* (2006.01)

(52) U.S. Cl.
CPC ............ *G06F 3/0412* (2013.01); *G06F 3/044* (2013.01); *G06F 3/04166* (2019.05); *G06F 2203/04103* (2013.01)

(58) Field of Classification Search
CPC combination set(s) only.
See application file for complete search history.

(56) References Cited

U.S. PATENT DOCUMENTS

2014/0035839 A1    2/2014  Cho
2015/0378486 A1*  12/2015  Yu ......................... G06F 3/0446
                                                                345/174

(Continued)

FOREIGN PATENT DOCUMENTS

CN    104730782 A    6/2015
CN    205080335 U    3/2016

(Continued)

OTHER PUBLICATIONS

International Search Report and Written Opinion dated Jun. 4, 2018;PCT/CN2018/078026.

*Primary Examiner* — Robin J Mishler (57) ABSTRACT

A touch substrate and a manufacturing method thereof, and an in-cell touch panel. The touch substrate includes: a base substrate, a first insulation layer, a transmission line and a common electrode. The first insulation layer is on the base substrate, and a groove extending in a first direction is in the first insulation layer; the transmission line is in the groove and is configured to transmit an electrical signal; the common electrode overlaps with the transmission line and is electrically connected with the transmission line.

16 Claims, 7 Drawing Sheets

(56) References Cited

U.S. PATENT DOCUMENTS

| | | | |
|---|---|---|---|
| 2016/0246399 A1* | 8/2016 | Huang | G09G 3/20 |
| 2016/0293632 A1 | 10/2016 | Yuan et al. | |
| 2017/0017327 A1* | 1/2017 | Chang | G06F 3/0412 |
| 2018/0032191 A1 | 2/2018 | Xiao et al. | |
| 2019/0115410 A1* | 4/2019 | Zhu | H01L 27/3272 |

FOREIGN PATENT DOCUMENTS

| | | |
|---|---|---|
| CN | 105974639 A | 9/2016 |
| CN | 206258845 U | 6/2017 |
| CN | 206946456 U | 1/2018 |

* cited by examiner

Fig. 7E

TOUCH SUBSTRATE AND MANUFACTURING METHOD THEREOF, IN-CELL TOUCH PANEL The application claims priority to the Chinese patent application No. 201720796916.1, filed on Jul. 3, 2017, the entire disclosure of which is incorporated herein by reference as part of the present application.

TECHNICAL FIELD

Embodiments of the present disclosure relate to a touch substrate and a manufacturing method thereof, and an in-cell touch panel.

BACKGROUND

Nowadays, the development trend of LCD is of becoming thin and lightweight, having a narrow border, a high resolution, a high response rate and a high PPI (the number of pixels per inch). As for a display apparatus such as a mobile phone, a tablet computer, etc., which requires a touch function, an in-cell touch display device simplifies the design of the structure of the display apparatus, and the in-cell touch display device can make the display screen of the display apparatus lighter and thinner, and at the same time, the in-cell touch display device can reduce the production cost. Now, in-cell touch display devices are rapidly replacing on-cell touch display devices. However, the in-cell touch display technology is still not perfect, and some problems about compatibility between display and touch exist. For example, in the design of transmission lines for an in-cell touch panel, transmission lines are usually designed near the frame of the black matrix to avoid affecting light transmittance ratio. In the case where a transmission line overlaps with an end of a pixel electrode, the local height of the pixel electrode is affected, so the liquid crystal electric field in the region where the transmission line overlaps with the end of the pixel electrode changes, thus the display apparatus using the in-cell touch panel is affected and defects such as Mura occur.

SUMMARY

At least one embodiment of the present disclosure provides a touch panel, and the touch panel includes a base substrate, a first insulation layer, a transmission line and a common electrode. The first insulation layer is on the base substrate, and a groove extending in a first direction is in the first insulation layer; the transmission line is in the groove and is configured to transmit an electrical signal; the common electrode overlaps with the transmission line and is electrically connected with the transmission line.

For example, the touch substrate provided by at least an embodiment of the present disclosure further includes a pixel electrode, the pixel electrode is at a side, away from the base substrate, of the transmission line, and an end of the pixel electrode overlaps with at least a portion of the transmission line.

For example, the touch substrate provided by at least an embodiment of the present disclosure further includes a gate line and a data line, the gate line and the data line intersects with each other, and the transmission line is parallel to the gate line.

For example, in the touch substrate provided by at least an embodiment of the present disclosure, the common electrode is at a side, away from the substrate, of the first insulation layer, at least a portion of the common electrode is formed in the groove, and the transmission line is at a side, away from the substrate, of the common electrode.

For example, in the touch substrate provided by at least an embodiment of the present disclosure, a surface, away from the base substrate, of the transmission line and a surface, away from the base substrate, of a portion, which is not in the groove, of the common electrode are substantially in a same plane.

For example, in the touch substrate provided by at least an embodiment of the present disclosure, the common electrode covers a side surface of the groove and a bottom surface of the groove, and the transmission line is in a groove formed by the common electrode.

For example, the touch substrate provided by at least an embodiment of the present disclosure further includes a second insulation layer, the second insulation layer is on the transmission line and the common electrode, and the second insulation layer covers the transmission line and the common electrode.

For example, in the touch substrate provided by at least an embodiment of the present disclosure, the transmission line is at a side, away from the substrate, of the first insulation layer, the common electrode is at a side, away from the substrate, of the transmission line, and the common electrode covers the transmission line and at least a portion of the first insulation layer.

For example, in the touch substrate provided by at least an embodiment of the present disclosure, a surface, away from the base substrate, of the transmission line and a surface, away from the base substrate, of the first insulation layer are substantially in a same plane.

For example, the touch substrate provided by at least an embodiment of the present disclosure further includes a second insulation layer, and the second insulation layer is at a side, away from the base substrate, of the common electrode, and the second insulation layer covers the common electrode.

For example, in the touch substrate provided by at least an embodiment of the present disclosure, the pixel electrode is at a side, away from the base substrate, of the second insulation layer.

For example, the touch substrate provided by at least an embodiment of the present disclosure further includes a passivation layer, and the passivation layer is at a side, away from the base substrate, of the pixel electrode, and the passivation layer covers the whole base substrate.

For example, in the touch substrate provided by at least an embodiment of the present disclosure, the transmission line is a metal wire.

At least one embodiment of the present disclosure further provides an in-cell touch panel, and the in-cell touch panel includes any one of the touch substrates provided by the embodiments of the present disclosure.

For example, the in-cell touch panel provided by at least an embodiment of the present disclosure further includes a touch detecting device and a controller, and the touch detecting device is electrically connected with the transmission line and is configured to detect a position of a touch point; the controller is in signal connection with the touch detecting device and configured to receive a detecting result from the touch detecting device.

At least one embodiment of the present disclosure further provides a method of manufacturing a touch substrate, and the manufacturing method includes: providing a base substrate; forming a first insulation layer on the base substrate, in which a groove extending in a first direction is provided in the first insulation layer; forming a transmission line, in which the transmission line is provided in the groove and configured to transmit an electrical signal; and forming a common electrode, in which the common electrode overlaps with the transmission line and is electrically connected with the transmission line.

For example, the manufacturing method provided by at least an embodiment of the present disclosure further includes forming a pixel electrode at a side, away from the base substrate, of the transmission line, and an end of the pixel electrode overlaps with at least a portion of the transmission line.

For example, in the manufacturing method provided by at least an embodiment of the present disclosure, the common electrode is provided at a side, away from the substrate, of the first insulation layer, at least a portion of the common electrode is formed in the groove, and the transmission line is provided at a side, away from the substrate, of the common electrode.

For example, in the manufacturing method provided by at least an embodiment of the present disclosure, the transmission line is provided at a side, away from the substrate, of the first insulation layer, the common electrode is provided at a side, away from the substrate, of the transmission line, and the common electrode covers the transmission line and at least a portion of the first insulation layer.

For example, in the manufacturing method provided by at least an embodiment of the present disclosure, a surface, away from the base substrate, of the transmission line and a surface, away from the base substrate, of a portion, which is not formed in the groove, of the common electrode are substantially in a same plane.

For example, in the manufacturing method provided by at least an embodiment of the present disclosure, a surface, away from the base substrate, of the transmission line and a surface, away from the base substrate, of the first insulation layer are substantially in a same plane.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

REFERENCE NUMBERS

101—substrate; 102—gate line; 103—planarization layer; 104—common electrode; 105—electrical signal line; 106—insulation layer; 107—pixel electrode; 108—passivation layer; 201—base substrate; 202—gate line; 203—first insulation layer; 204—common electrode; 205—transmission line; 206—second insulation layer; 207—pixel electrode; 208—passivation layer; 209—data line; 210—groove; 1—in-cell touch panel; 2—driving device; 3—touch detecting device; 4—controller.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment (s), without any inventive work, which should be within the scope of the disclosure.

Unless otherwise defined, all the technical and scientific terms used herein have the same meanings as commonly understood by one of ordinary skill in the art to which the present disclosure belongs. The teens "first," "second," etc., which are used in the description and the claims of the present application for disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. "In," "outside" and the like are only used to indicate relative position relationship, and when the position of the object which is described is changed, the relative position relationship may be changed accordingly.

The figures used to describe the embodiments of the present disclosure are not drawn according to actual proportions or scales. The figures only illustrate structures related to the technical features of the present disclosure, and other structures can be referred to the common designs. The figures of the embodiments of the present disclosure are only schematic views.

Figure 2:
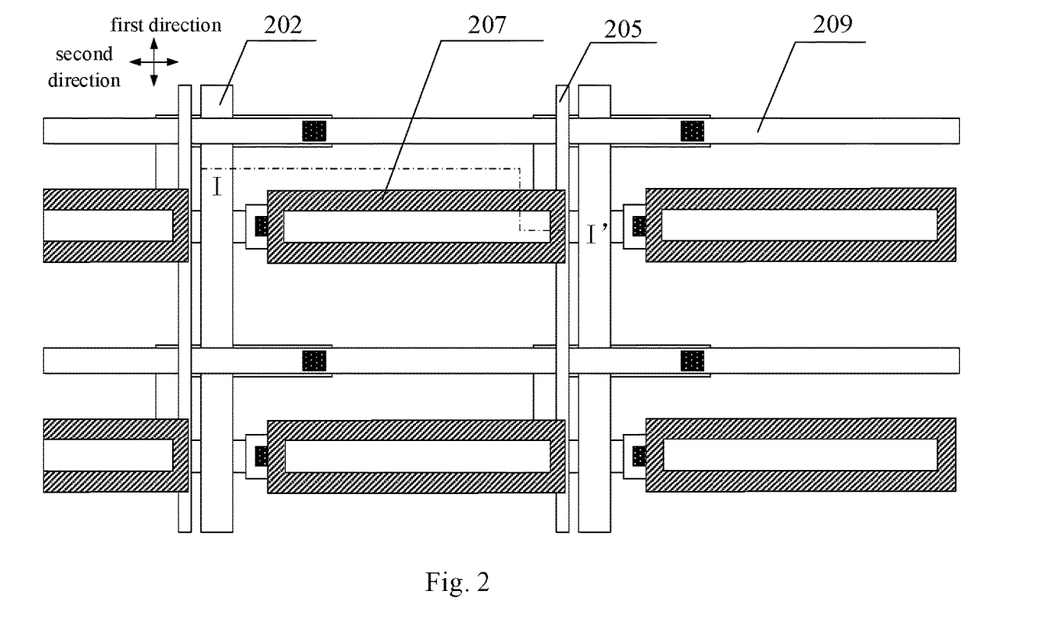
FIG. 2 is a top view of a touch substrate provided by an embodiment of the present disclosure.

For the convenience of illustration, in the present disclosure, the first direction and the second direction are shown in FIG. 2, the first direction refers to extension direction of the transmission line, and the second direction is perpendicular to the first direction.

Figure 1:
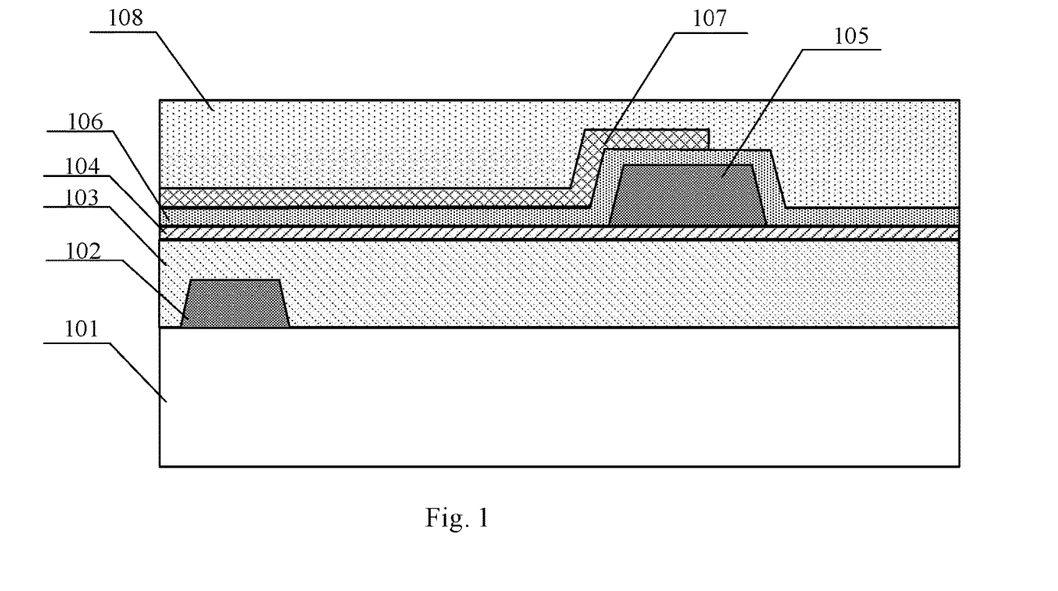
FIG. 1 is a cross-sectional view of a touch substrate.

FIG. 1 is a cross-sectional view of a touch substrate, and the touch substrate includes a base substrate 101 and a gate electrode (not illustrated in FIG. 1) 101, a gate line 102, a source electrode (not illustrated in FIG. 1), a drain electrode (not illustrated in FIG. 1) and a signal line (not illustrated in FIG. 1), which are provided on the base substrate, and the touch substrate further includes a planarization layer 103 covering the whole base substrate, the gate electrode, the gate line, the source electrode, the drain electrode and the signal line. A common electrode 104 is on the planarization layer 103. For an in-cell touch display device, an electrical signal line 105 for transmitting a touch signal can be provided on the planarization layer 103, an insulation layer 106 is provided on the electrical signal line 105 and the common electrode 104, a pixel electrode 107 is provided on the insulation layer 106, an end of the pixel electrode 107 overlaps with a portion of the electrical signal line 105, and a passivation layer 108 covering the whole base substrate is provided on the pixel electrode 107. As illustrated in FIG. 1, the electrical signal line 105 is provided on the flat planarization layer 103, so that the end, which overlaps with the electrical signal line 105, of the pixel electrode 107 is raised high, which causes a difference of electrical field between a region where the end of the pixel electrode 107 overlaps with the electrical signal line 105 and a region where the end of the pixel electrode 107 does not overlap with the electrical signal line 105 when the display device works, thus the display quality of the display device is affected, for example, defects such as Mura, etc., occur.

At least one embodiment of the present disclosure provides a touch panel, and the touch panel includes a base substrate, a first insulation layer, a transmission line and a common electrode. The first insulation layer is on the base substrate, and a groove extending in a first direction is in the first insulation layer; the transmission line is in the groove and is configured to transmit an electrical signal; the common electrode overlaps with the transmission line and is electrically connected with the transmission line.

At least one embodiment of the present disclosure provides a touch panel, and the touch panel includes a base substrate, a first insulation layer, a transmission line and a common electrode. The first insulation layer is on the base substrate, and a groove extending in a first direction is in the first insulation layer; the transmission line is in the groove and is configured to transmit an electrical signal, such as a common voltage signal and a touch scanning signal; the common electrode overlaps with the transmission line and is electrically connected with the transmission line.

Figure 3:
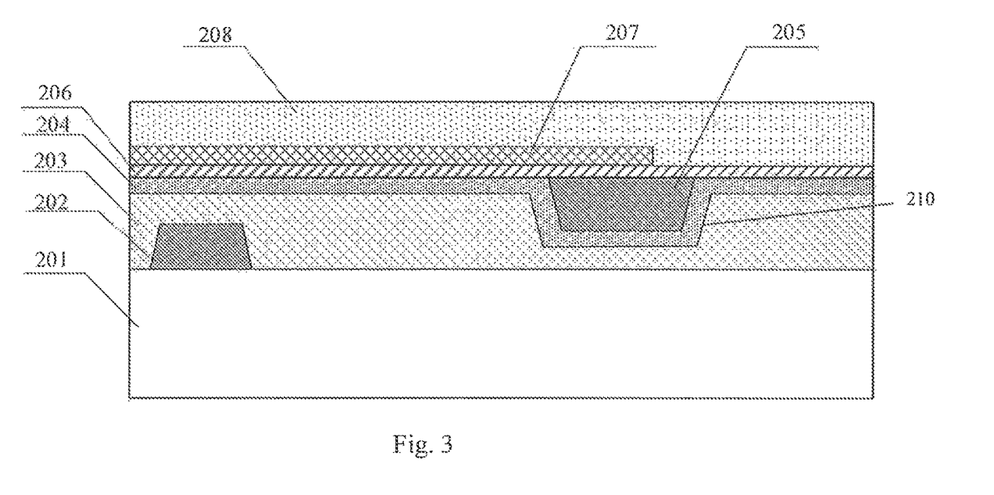
FIG. 3 is a cross-sectional view of a touch substrate provided by an embodiment of the present disclosure along a line I-I' illustrated in FIG. 2.

FIG. 2 is a top view of a touch substrate provided by an embodiment of the present disclosure; FIG. 3 is a cross-sectional view of a touch substrate provided by an embodiment of the present disclosure along a line I-I' illustrated in FIG. 2.

Referring to FIG. 2 and FIG. 3, the touch substrate includes a base substrate 201. a first insulation layer 203, a transmission line 205 and a common electrode 204. The first insulation layer 203 is on the base substrate 201, and a groove 210 extending in a first direction is in the first insulation layer 203. The first insulation layer 203, for example, is a gate insulation layer, that is, the insulation layer between a gate electrode and an active layer in a thin film transistor in the touch substrate. For example, the gate electrode is electrically connected with a gate line, or the gate electrode and the gate line are integrated as a whole, and the first insulation layer 203 can also be an insulation layer having another function, for example, a passivation layer, a planarization layer, etc. For example, the common electrode 204 is at a side, away for the base substrate 201, of the first insulation layer 203, and a portion of the common electrode 204 is in the groove 210 and covers at least a part of the surfaces of the groove 210, for example, a side surface of the groove 210 and a bottom surface of the groove 210. The transmission line 205 is at a side, away from the base substrate 201, of the portion, which is in the groove 210, of the common electrode 204, that is, the transmission line 205 is in a groove 210 formed by the common electrode 204. For example, a surface, away from the base substrate 201, of the transmission line 205 and a surface, away from the base substrate 201, of a portion, which is not in the groove 210, of the common electrode 204 are substantially in a same plane, so that the height of the surface, away from the base substrate 201, of the transmission line 205 is reduced, which is beneficial to forming of a flat surface on the transmission line 205.

In the embodiments illustrated in FIG. 2 and FIG. 3, the touch substrate further includes a pixel electrode 207 in a pixel region, and the pixel electrode 207 is at a side, away from the base substrate 201, of the transmission line 205, and an end of the pixel electrode 207 overlaps with a portion of the transmission line 205. Of course, in other embodiments of the present disclosure, the end of the pixel electrode 207 can overlap with the whole width of the transmission line 205, and the width is in a direction perpendicular to the extension direction of the transmission line 205. In the touch substrate provided by at least an embodiment of the present disclosure, because the structure in which the transmission line 205 is in the groove 210 is adopted, a flat surface can be formed on the transmission line 205, thus in a region where the end of the pixel electrode 207 overlaps with the transmission line 205, the end of the pixel electrode 207 cannot be raised high by the transmission line 205 which overlaps with the end of the pixel electrode 207, thus the electric field in the region cannot be interfered, and display defects caused by the difference of electric field due to the end of the pixel electrode 207 that is raised high can be avoided.

For example, as illustrated in FIG. 3, the touch substrate further includes a second insulation layer 206, the second insulation layer 206 is on the transmission line 205 and the common electrode 204 and covers the transmission line 205 and the common electrode 204, so that the common electrode 204 and the transmission line 205 are insulated from the pixel electrode 207, and the common electrode 204 and the transmission line 205 are protected by the second insulation layer 206, and also, a flatter surface can be formed on the common electrode 204 and the transmission line 205.

For example, as illustrated in FIG. 3, the touch substrate further includes a passivation layer 208, and the passivation layer 208 is at a side, away from the base substrate 201, of the pixel electrode 207 and covers the whole base substrate 201, so that a protection layer and a flat surface are formed by the passivation layer 208 on the touch substrate.

In the embodiments illustrated in FIG. 2 and FIG. 3, the first insulation layer 203, the second insulation layer 206 and the passivation layer 208 are made of a common insulation material in the related art, for example, silicon nitride, silicon oxide, etc. For example, the transmission line 205 is a metal electrical wire made of a metal material, and the metal material, for example, is aluminium, copper, aluminium alloy or copper alloy, etc. For example, the common electrode 204 is made of a transparent conductive material, such as indium tin oxide (ITO), indium zinc oxide (IZO), zinc oxide (AZO) doped with aluminum or tin oxide (FTO) doped with fluorine, etc. Limitations are not imposed to materials of the first insulation layer 203, the second insulation layer 206, the passivation layer 208, the transmission line 205 and the common electrode 204 in the embodiments of the present disclosure.

It should be noted that in the embodiments illustrated in FIG. 2 and FIG. 3, the transmission line 205 is directly formed on the common electrode 204 (that is a side, away from the base substrate, of the common electrode), the common electrode 204 directly contacts with the transmission line 205 so that the common electrode 204 is electrically connected with the transmission line 205, thus the transmission line 205 can transmit electrical signals, for example, a common voltage signal and a touch scanning signal. Compared with the case where the common electrode 204 is electrically connected with the transmission line 205 via an electrical line through via-holes, in the embodiments provided by the present disclosure, the resultant structure is equivalent to that the transmission line 205 with a small resistance is connected with the common electrode 204 with a large resistance in parallel at multiple positions. Generally, the resistance of the transparent conductive material (for example, ITO) for forming the common electrode 204 is greater than the resistance of the metal material (for example, copper) for forming the transmission line 205. Therefore, a parallel structure formed by the common electrode 204 and the transmission line 205 can reduce the resistance of the transmission circuit transmitting the common voltage signal and the touch scanning signal via the transmission line 205, which can increase the transmission speed of the common voltage signal and the touch scanning signal.

For example, as illustrated in FIG. 2 and FIG. 3, the touch substrate further includes gate lines 202 and data lines 209, the gate lines 202 and the data lines 209 intersect with each other to define pixel regions. The gate lines 202 and the data lines 209 are provided on the base substrate 201, for example, the gate lines 202 extend along the first direction, that is, the transmission line 205 is parallel to the gate lines 202, and the data line 209 extend along a second direction, for example, the first direction is perpendicular to the second direction. The touch substrate further includes a thin film transistor configured to be a switch element, and the thin film transistor includes a gate electrode electrically connected with a gate line 202, a source electrode electrically connected with a data line and a drain electrode electrically connected with a pixel electrode, etc. Because structures such as the data lines, the gate electrode and the drain electrode have no direct relationship with the main technical features of the embodiments of the present disclosure, for convenience of illustration, the data lines 209, the gate electrode and the drain electrode, etc. are not illustrated in the cross-sectional view FIG. 3, and only the gate line 202 is illustrated in FIG. 3. The first insulation layer 203 covers the whole base substrate 201, the gate line 202, the data line 209, the gate electrode and the drain electrode, etc. For example, the common electrode 204 covers the whole base substrate 201, or the common electrode 204 is divided into a plurality of sub-electrodes, and each of the sub-electrodes covers a plurality of pixel regions or a single pixel region.

It should be noted that in a touch substrate illustrated in FIG. 3, the common electrode 204 is reused as a touch electrode; if the touch substrate is applied to an in-cell touch display device, when the in-cell touch display device performs the function of display, a common signal is transmitted to the common electrode 204 via the transmission line 205, and when the in-cell touch display device performs the function of touch control, a touch signal is transmitted to the common electrode 204 via the transmission line 205, that is to say, the transmission line 205 is used to transmit the common voltage signal and the touch scanning signal. The in-cell touch display device adopting the touch substrate can adopt the way of "time-sharing scanning", in this way, the unit of scanning time is divided into two parts, one part is used for touch scanning, and the other part is used for display scanning, so that the touch scanning and the display scanning do not interfere with each other, and this can reduce or avoid the potential interference between the touch signal and a display signal. In this way, the common electrode 204 has two different functions, which is beneficial to achieving of a high integration degree, reducing the thickness of the whole touch substrate, and saving a cost.

Another embodiment of the present disclosure provides another touch substrate, and the difference between this touch substrate and the touch substrate illustrated in FIG. 3 is that the transmission line is below the common electrode, that is, the transmission line is at a side, closer to the base substrate, of the common electrode.

Figure 4:
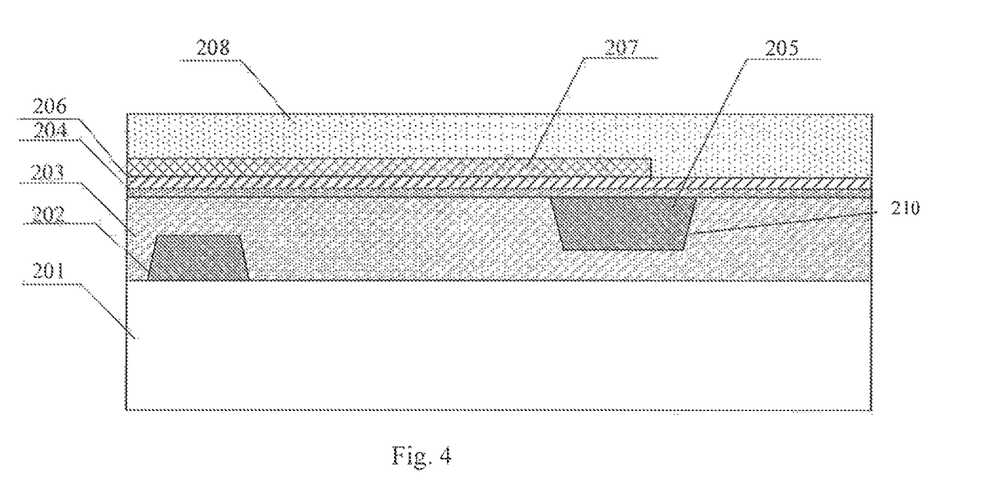
FIG. 4 is another cross-sectional view of a touch substrate provided by an embodiment of the present disclosure along a line I-I' illustrated in FIG. 2.

FIG. 4 is another local cross-sectional view of a local section of a touch substrate provided by an embodiment of the present disclosure along a line I-I' illustrated in FIG. 2. In FIG. 4, the touch substrate includes a base substrate 201, a first insulation layer 203, a transmission line 205 and a common electrode 204. The first insulation layer 203 is on the base substrate 201, and a groove 210 extending in a first direction is in the first insulation layer 203. For example, the transmission line 205 is in the groove 210 and directly contacts with the first insulation layer 203, and the surface, away from the base substrate 201, of the transmission line 205 and the surface, away from the base substrate 201, of the first insulation layer 203 are substantially in a same plane, so that the height of the surface, away from the base substrate 201, of the transmission line 205 is reduced, which is beneficial to forming of a flat surface on the transmission line 205. For example, the common electrode 204 is at the side, away from the substrate 201, of the transmission line 205, and the common electrode 204 covers the transmission line 205 and a portion of the first insulation layer 203, which can also enable the common electrode 204 to directly contact with the transmission line 205 and achieve an electrical connection of the common electrode 204 with the transmission line 205. The technical effects of the embodiment illustrated in FIG. 4 are the same as those of the embodiment illustrated in FIG. 3, and the advantages of the embodiment illustrated in FIG. 4 can be referred to the description about the embodiment illustrated in FIG. 3. A flat surface is formed on the transmission line 205 and the first insulation layer 203 by the common electrode 204.

In the embodiment illustrated in FIG. 4, the touch substrate further includes a second insulation layer 206 at the side, away from the base substrate 201, of the common electrode 204, and the second insulation layer 206 covers the common electrode 204. The pixel electrode 207 is on the second insulation layer 206, that is, the pixel electrode 207 is at the side, away from the base substrate 201, of the second insulation layer 206, and an end of the pixel electrode 207 overlaps with a portion of the transmission line 205, thus in a region where the pixel electrode 207 overlaps with a portion of the transmission line 205, the end of the pixel electrode 207 cannot be raised high by the portion, which overlaps with the end of the pixel electrode 207, of the transmission line 205. The touch substrate further includes other structures, such as a passivation layer 208, a gate line 202, etc., which are the same as those in the embodiment illustrated in FIG. 3.

It should be noted that technical effects, principles, other technical features, such as materials of the components, which are not mentioned in the embodiment illustrated in FIG. 4 are the same as those in the embodiment illustrated in FIG. 3 and can be referred to the descriptions about the embodiment illustrated in FIG. 3.

At least one embodiment of the present disclosure further provides an in-cell touch panel, and the in-cell touch panel includes any one of the touch substrates provided by the embodiments of the present disclosure. The in-cell touch display device adopting the touch substrate can avoid defects caused by the end of the pixel electrode 207 that is raised high by the transmission line, and the resistance of a transmission circuit transmitting the signal is reduced and the transmission speed of the signal is increased.

Figure 5:
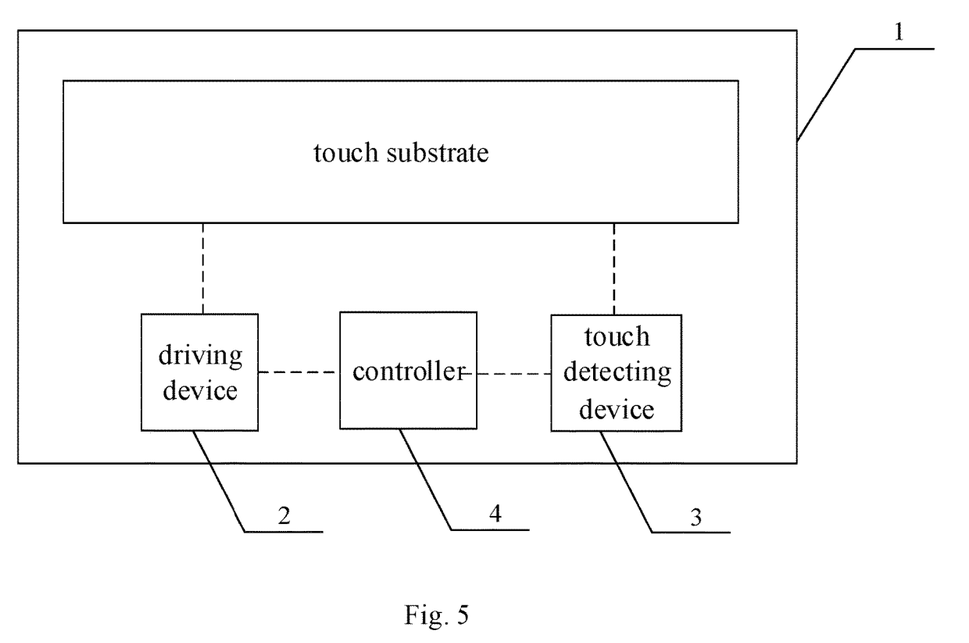
FIG. 5 is a schematic diagram of an in-cell touch panel provided by an embodiment of the present disclosure.

FIG. 5 is a schematic diagram of an in-cell touch panel provided by an embodiment of the present disclosure. The in-cell touch panel 1 includes any one of the touch substrates provided by the embodiments of the present disclosure, and further includes a driving device 2, a touch detecting device 3 and a controller 4. The touch detecting device 3 is electrically connected with the transmission line and is configured to detect the position of a touch point, and for example, the touch detecting device 3 is electrically connected with the driving device 2 or is arranged independently; the controller 4 is in signal connection (for example, an electrical connection) with the touch detecting device 3 and configured to receive a detecting result from the touch detecting device 3. In a case where the common electrode is reused as a touch electrode, the common electrode can work in the mechanism of self-capacitance or mutual capacitance. A working process of the in-cell touch panel is described taking that the common electrode works in the mechanism of self-capacitance as an example, but limitations are not imposed to this way. When the in-cell touch panel 1 works, the in-cell touch display device adopts a way of "time-sharing scanning", that is, the unit of scanning time is divided into two parts, one part is used for touch operation, and the other part is used for display scanning. For example, the driving device 2 is configured to supply a common voltage signal and a touch scanning signal. When the in-cell touch panel 1 performs the function of display, the common voltage signal given by the driving device 2 is transmitted to the common electrode via the transmission line, the common electrode is reused as a common electrode for display at this time; when the in-cell touch panel performs the function of touch control, the touch scanning signal supplied by the driving device 2 is transmitted to the common electrode via the transmission line, the common electrode is reused as a touch electrode. For example, when a finger touches a capacitive touch screen, the capacitance from the finger is added to the capacitance of the touch electrode, so that the capacitance of the touch electrode changes, the touch detecting device 3 can detect the change in the capacitance before and after the touch, and the touch detecting device 3 receives a scanning result (information about the change in the capacitance) via the transmission line and then analyze and calculate the scanning result and convert the scanning result into the location coordinate of the touch point, and then send the location coordinate to the controller 4. In a case where the in-cell touch panel is applied in a touch display device, for example, the controller 4 is a processor of the touch display device (for example, CPU, etc.), and the controller 4 can control operations of the driving device 2 at the same time.

It should be noted that FIG. 5 is only a schematic diagram of an in-cell touch panel provided by an embodiment of the present disclosure, and limitations are not imposed to positions and specific connection methods of the touch detecting device, the driving device and the controller. The positions and the specific connection methods of the touch detecting device, the driving device and the controller can be referred to common designs in the related art, and other structures not mentioned for the in-cell touch panel can also be referred to common designs in the related art.

At least one embodiment of the present disclosure further provides a display device, and the display device includes any one of the in-cell touch panel provided by the embodiments of the present disclosure. For example, the display device is a liquid crystal display device, an organic light-emitting diode display device or an electronic ink display device, etc.

For example, the display device provided by the embodiments of the present disclosure include any products or components having display function as follows: e-Paper, mobile phone, panel computer, TV set, display apparatus, laptop, digital photo frame, navigation instrument or the like.

At least one embodiment of the present disclosure further provides a manufacturing method of a touch substrate, and the manufacturing method includes: providing a base substrate; forming a first insulation layer on the base substrate, in which a groove extending in a first direction is provided in the first insulation layer; forming a transmission line, and the transmission line is provided in the groove and is configured to transmit an electrical signal; and forming a common electrode, in which the common electrode overlaps with the transmission line and is electrically connected with the transmission line.

Figure 6A:
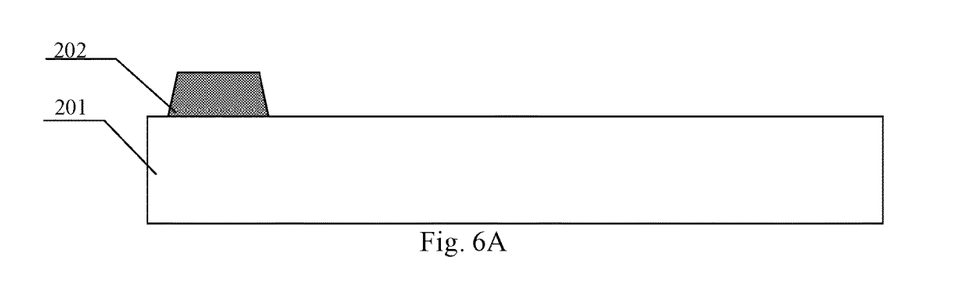
FIGS. 6A-6H are schematic views of a manufacturing method of a touch substrate provided by an embodiment of the present disclosure.

Exemplary, FIGS. 6A-6H are schematic views of a method of manufacturing a touch substrate provided by an embodiment of the present disclosure. As illustrated in FIG. 6A, a base substrate 201 is provided, and a gate line 202 and a data line (not shown in the figure) intersects with each other to define a pixel region are provided on the base substrate 201. For example, the gate line 202 extends in a first direction, and the data line extends in a second direction. and for example, the first direction is perpendicular to the second direction. The manufacturing method further includes providing, for example, a thin film transistor on base substrate 201, and the thin film transistor is configured to be a switch element, and the thin film transistor includes a gate electrode electrically connected with the gate line 202, a source electrode electrically connected with the data line, and a drain electrode electrically connected with the pixel electrode, etc. Because structures such as the data line, the gate electrode and the drain electrode have no direct relationship with the main technical features of the embodiments of the present disclosure, only the gate line 202 is illustrated in FIG. 3. For example, the base substrate 201 is a glass substrate, a quartz substrate, a resin (for example, polyethylene) substrate, etc., or a flexible substrate, such as a flexible substrate made of polyimides, etc.

Figure 6B:
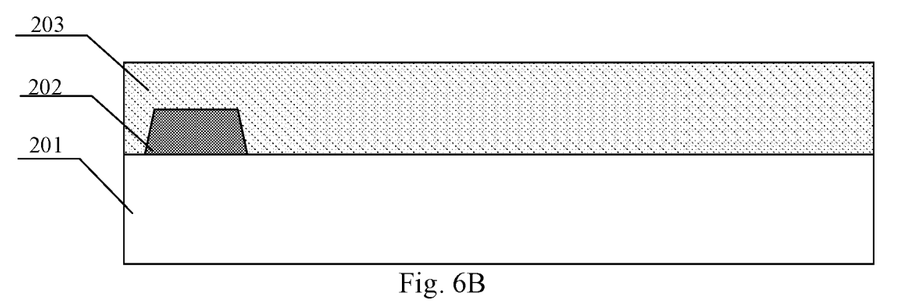

As illustrated in FIG. 6B, a first insulation layer 203 is formed on the base substrate 201 and the gate line 202. For example, the first insulation layer 203 is formed by a method of coating. The first insulation layer 203 can be made of a common insulation material in the related art, for example, silicon oxide, etc. For example, the material of the first insulation layer 203 is a photosensitive material, so that it is convenient for carrying out a subsequent lithography process. For example, the photosensitive material includes a resin including a photoresist material. Of course, the material of the first insulation layer 203 can also be other materials, and it can be determined by those skilled in the art according to actual requirements.

Figure 6C:
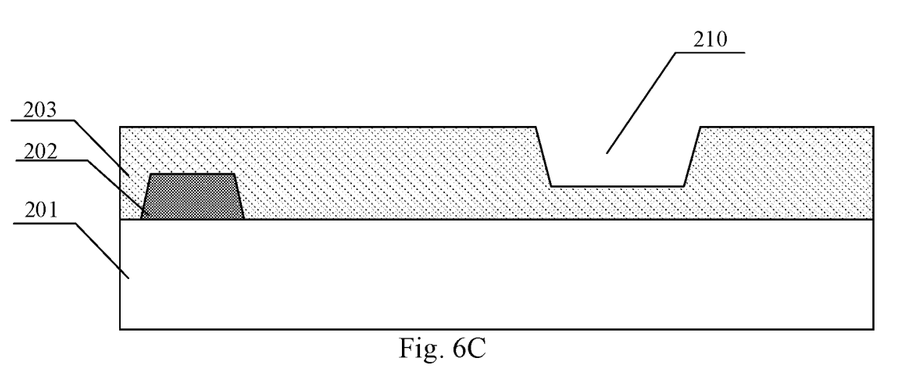

As illustrated in FIG. 6C, a groove 210 extending in the first direction is formed in the first insulation layer 203 by performing a patterning process on the first insulation layer 203. For example, the extension direction of the groove 210 is the same as the extension direction of the gate line 202. For example, in the case where the material of the first insulation layer 203 is an organic material such as a resin material, and the resin material includes, for example, a photoresist material, the patterning process is an imprint process or a photolithography process; in the case where the material of the first insulation layer 203 is an inorganic material such as silicon nitride and silicon oxide, etc., the patterning process is a photolithography process.

Figure 6D:
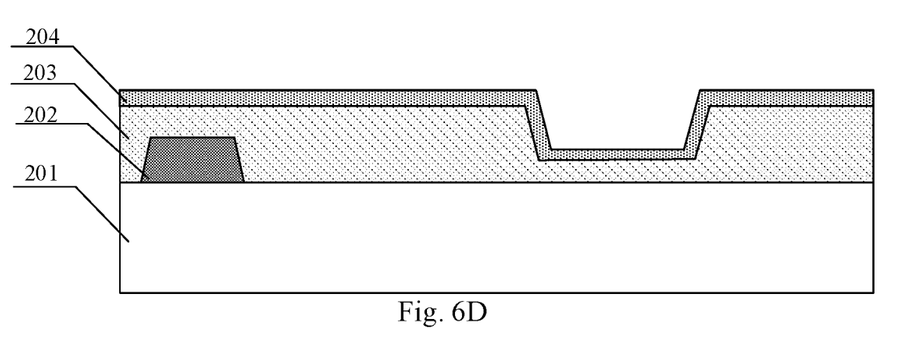

As illustrated in FIG. 6D, the common electrode 204 is formed at the side, away for the base substrate 201, of the first insulation layer 203, and a portion of the common electrode 204 is formed in the groove 210 and covers at least a part of the surfaces of the groove 210, for example, a side surface of the groove 210 and a bottom surface of the groove 210. For example, the common electrode 204 is made of a transparent conductive material, such as indium tin oxide (ITO), indium zinc oxide (IZO), zinc oxide (AZO) doped with aluminum or tin oxide (FTO) doped with fluorine, etc. The material of the common electrode is not limited to the types listed above, and limitations are not imposed in this aspect.

Figure 6E:
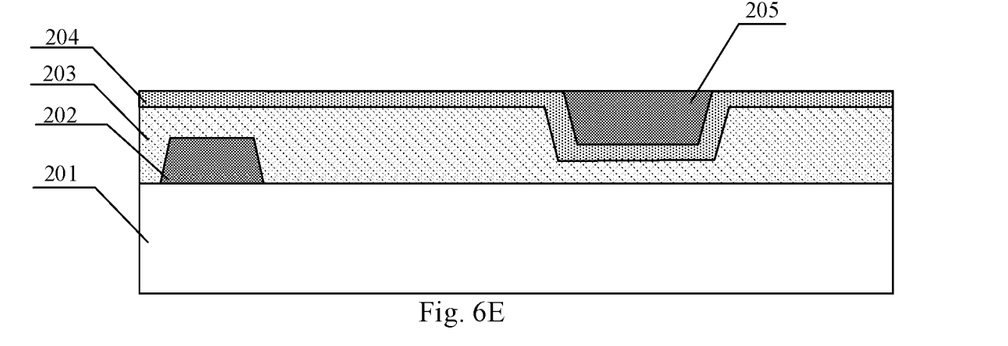

As illustrated in FIG. 6E, a transmission line 205 with a certain thickness is formed by a method of evaporation or deposition combining a mask. The transmission line 205 is formed in the groove 210 and is configured to transmit an electrical signal. The common electrode 204 overlaps with the transmission line 205, and the common electrode 204 directly contacts with the transmission line 205 so that the common electrode 204 is electrically connected with the transmission line 205. Compared with the case where the common electrode 204 is electrically connected with the transmission line 205 via an electrical line through a via-hole, in the embodiments provided by the present disclosure, it is equivalent to that the transmission line 205. with a small resistance is connected with the common electrode 204 with a large resistance in parallel at multiple positions. Generally, the resistance of the transparent conductive material (for example, ITO) for forming the common electrode 204 is greater than the resistance of the metal material (for example, copper) for forming the transmission line 205. Therefore, the parallel structure formed by the common electrode 204 and the transmission line 205 can reduce the resistance of a transmission circuit transmitting the common voltage signal and the touch scanning signal via the transmission line 205, which can increase the transmission speed of the common voltage signal and the touch scanning signal.

For example, in a process of forming the transmission line 205, by controlling the thickness of the transmission line 205, it can be achieved that the surface, away from the base substrate 201, of the transmission line 205 and the surface, away from the base substrate 201, of a portion, which is not formed in the groove 210, of the common electrode 204 are substantially in a same plane, so that the height of the surface, away from the base substrate 201, of the transmission line 205 is reduced, which is beneficial to forming of a flat surface on the transmission line 205.

For example, the transmission line 205 is a metal electrical wire made of a metal material, and the metal material, for example, is aluminium, copper, aluminium alloy or copper alloy, etc. The material of the transmission line is not limited to the types listed above, and limitations are not imposed in this aspect.

Figure 6F:
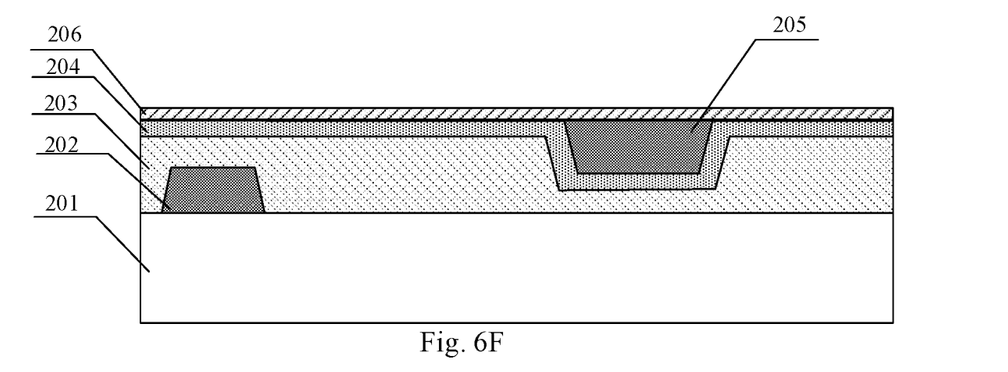

As illustrated in FIG. 6F, a second insulation layer 206 is formed on the common electrode 204 and the transmission line 205, and the second insulation layer 206 covers the transmission line 205 and the common electrode 204, so that the common electrode 204 is insulated from the pixel electrode which is formed subsequently, the transmission line 205 is insulated from the pixel electrode 207, and the common electrode 204 and the transmission line 205 are protected by the second insulation layer 206, at the same time, a flatter surface can be formed on the common electrode 204 and the transmission line 205. For example, the second insulation layer 206 is made of a common insulation material in the related art, for example, silicon nitride and silicon oxide, etc., and limitations are not imposed to the material of the second insulation layer.

Figure 6G:
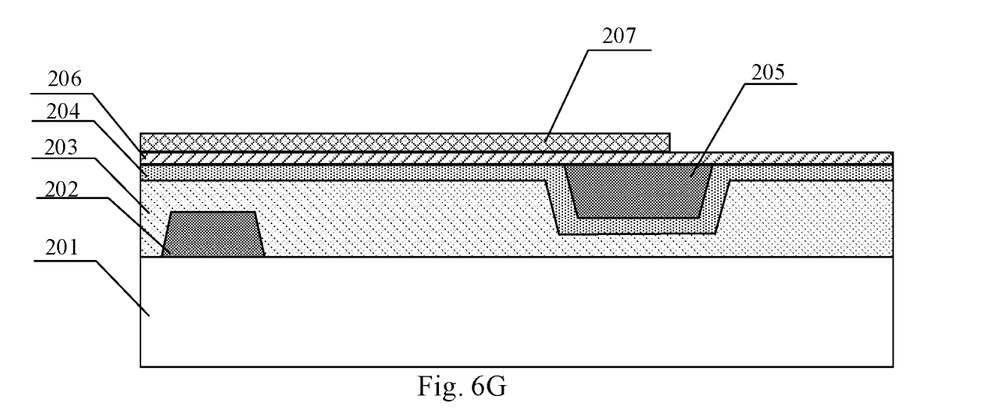

The manufacturing method further includes forming a pixel electrode 207 at the side, away from the base substrate 201, of the transmission line 205. As illustrated in FIG. 6G, the pixel electrode 207 is formed at the side, away from the base substrate 201, of the second insulation layer 206, and an end of the pixel electrode 207 overlaps with a portion (a portion in width) of the transmission line 205. Of course, in other embodiments of the present disclosure, the end of the pixel electrode 207 can overlap with the whole width of the transmission line 205. In the touch substrate formed by the manufacturing method provided by the embodiments of the present disclosure, because the structure in which the transmission line 205 is in the groove 210 is adopted, a flat surface can be formed on the transmission line 205, thus in the region where the end of the pixel electrode 207 overlaps with the transmission line 205, the end of the pixel electrode 207 cannot be raised high by the transmission line 205 which overlaps with the end of the pixel electrode 207, thus the electric field in the region cannot be interfered, and display defects caused by the difference of electric field due to the end of the pixel electrode 207 that is raised high can be avoided.

Figure 6H:
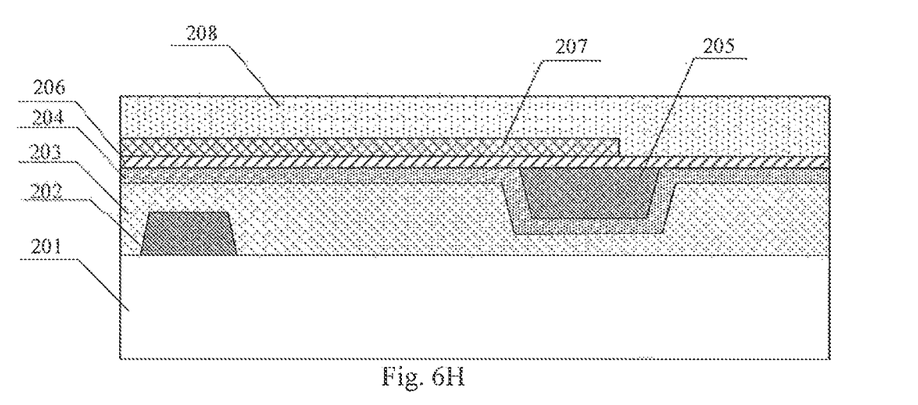

As illustrated in FIG. 6H, the manufacturing method further includes forming a passivation layer 208 at the side, away from the base substrate 201, of the pixel electrode 207, and the passivation layer 208 covers the whole base substrate 201, so that a protection layer and a flat surface are formed on the touch substrate. In this way, the touch substrate as illustrated in FIG. 6H is obtained. For example, the passivation layer 208 is made of a common insulation material in the related art, for example, silicon nitride and silicon oxide, etc. Limitations are not imposed to the material of the second insulation layer.

FIGS. 7A-7E are schematic views of another manufacturing method of a touch substrate provided by an embodiment of the present disclosure. In following, only differences between the method illustrated in FIGS. 6A-6H and the method illustrated in FIGS. 7A-7E are described.

Figure 7A:
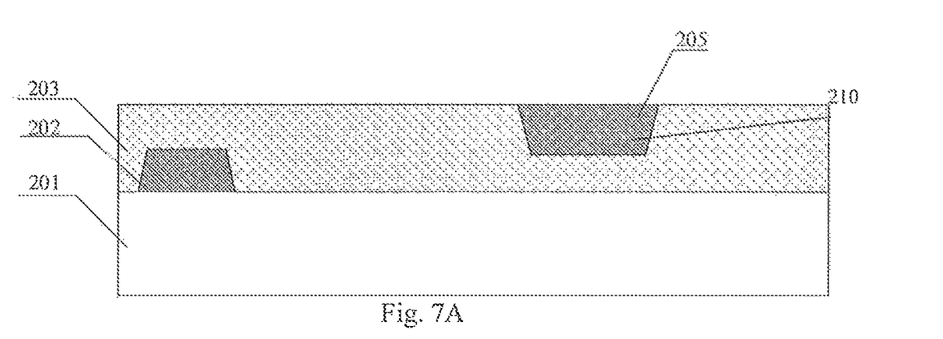
FIGS. 7A-7E are schematic views of another manufacturing method of a touch substrate provided by an embodiment of the present disclosure.

As illustrated in FIG. 7A, after forming the structure illustrated in FIG. 6C, a transmission line 205 is formed at the side, away from the base substrate 201, of the first insulation layer 203, and the transmission line 205 is provided in the groove 210. For example, the transmission line 205 with a certain thickness is formed by a method of evaporation or deposition with a mask. For example, in a process of forming the transmission line 205, by controlling the thickness of the transmission line 205, it can be achieved that the surface, away from the base substrate 201, of the transmission line 205 and the surface, away from the base substrate 201, of the first insulation layer 203 are substantially in a same plane, so that the height of the surface, away from the base substrate 201, of the transmission line 205 is reduced, which is beneficial to forming of a flat surface on the transmission line 205. That is to say, the present embodiment can reach the same technical effect as the embodiment illustrated in FIGS. 6A-6H.

Figure 7B:
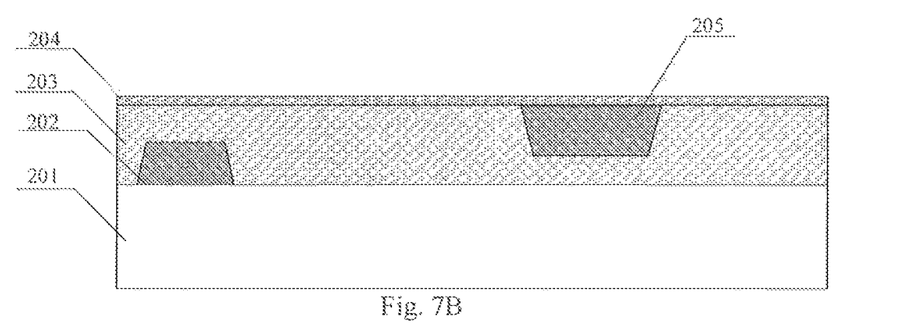

As illustrated in FIG. 7B, the common electrode 204 is formed at the side, away for the base substrate 201, of the transmission line 205, the common electrode 204 covers the transmission line 205 and at least a portion of the first insulation layer 203. In this way, the common electrode 204 directly contacts with the transmission line 205 so that the common electrode 204 is electrically connected with the transmission line 205, and the specific technical effect can be referred to the descriptions in the embodiment illustrated in FIGS. 6A-6H. A flat surface is formed by the common electrode 204 on the transmission line 205 and the first insulation layer 203.

Figure 7C:
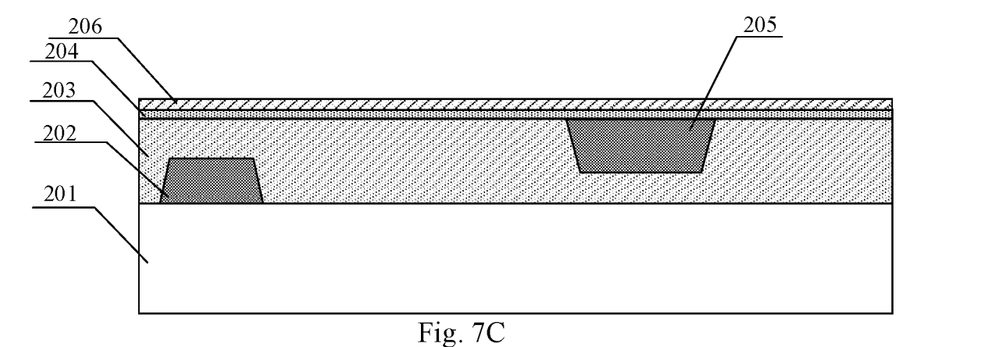

As illustrated in FIG. 7C, a second insulation layer 206 is formed at the side, away from the base substrate 201, of the common electrode 204, and the second insulation layer 206 covers the transmission line 205 and the common electrode 204, so that the common electrode 204 and the transmission line 205 are insulated from the pixel electrode 207, and the common electrode 204 and the transmission line 205 are protected by the second insulation layer 206, and also, a flatter surface can be formed on the common electrode 204 and the transmission line 205. A material of the second insulation layer 206 can be referred to the descriptions above.

Figure 7D:
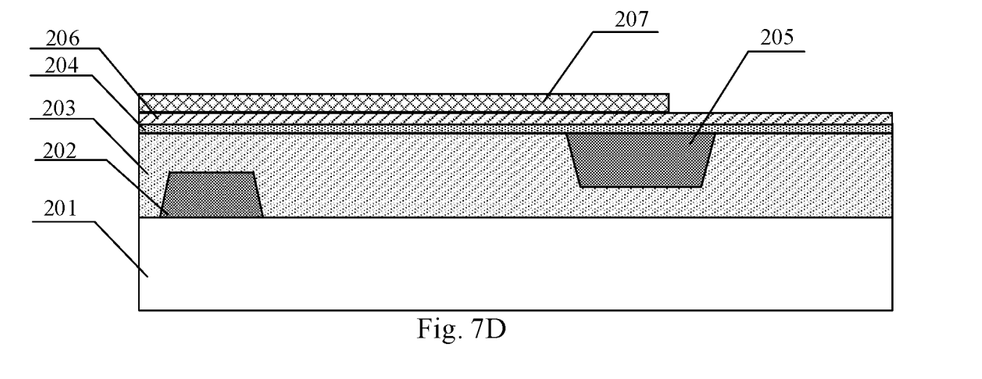

As illustrated in FIG. 7D, a pixel electrode 207 is formed at the side, away from the base substrate 201, of the second insulation layer 206, and an end of the pixel electrode 207 overlaps with a portion (a portion in width) of the transmission line 205. Of course, in other embodiments of the present disclosure, the end of the pixel electrode 207 can overlap with the whole width of the transmission line 205.

Figure 7E:
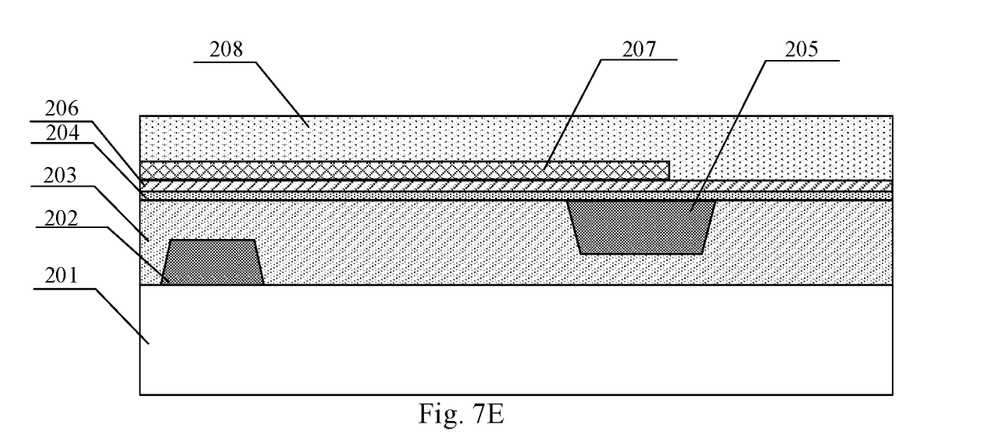

As illustrated in FIG. 7E, the manufacturing method further includes forming a passivation layer 208 at the side, away from the base substrate 201, of the pixel electrode 207, and the passivation layer 208 covers the whole base substrate. 201, so that a protection layer and a flat surface are formed on the touch substrate. In this way, the touch substrate illustrated in FIG. 7E is obtained.

It should be noted that technical effects, structures, and other technical features, such as materials of the structures, etc., which are not mentioned in the embodiment illustrated in FIGS. 7A-7E are the same as those in the embodiment illustrated in FIGS. 6A-6H and can be referred to the descriptions about the embodiment illustrated in FIGS. 6A-6H.

In the touch substrate formed by the manufacturing method provided by the embodiments of the present disclosure, the common electrode 204 is reused as a touch electrode; if the touch substrate is applied to an in-cell touch display device, when the in-cell touch display device performs the function of display, a common signal is transmitted to the common electrode 204 via the transmission line 205, and when the in-cell touch display device performs the function of touch control, a touch signal is transmitted to the common electrode 204 via the transmission line 205, that is to say, the transmission line 205 is used to transmit the common voltage signal and the touch scanning signal. The in-cell touch display device adopting the touch substrate can adopt a way of "time-sharing scanning", in this way, the unit of scanning time is divided into two parts, one part is used for touch scanning, and the other part is used for display scanning, so that the touch scanning and the display scanning do not interfere with each other, and this can reduce or avoid a potential interference between the touch signal and a display signal. In this way, the common electrode 204 has two different functions, which is beneficial to achieving of a high integration degree, reducing the thickness of the whole touch substrate, and saving a cost.

At least one embodiment of the present disclosure further provides a display method, the display method is adapted to any one of the in-cell touch panel provided by the embodiments of the present disclosure, and the display method includes: transmitting a common voltage signal to the common electrode via the transmission line, so that the in-cell touch panel performs a function of display; or, transmitting a touch scanning signal to the common electrode via the transmission line, so that the in-cell touch panel performs a function of touch control.

Referring to FIG. 5, in the in-cell touch panel, in the case where the common electrode is reused as a touch electrode, the common electrode can work in the mechanism of self-capacitance or mutual capacitance. A working process of the in-cell touch panel is described by taking that the common electrode works in the mechanism of self-capacitance as an example, but limitations are not imposed in this way.

When the in-cell touch panel 1 works, the in-cell touch display device adopts the way of "time-sharing scanning", that is, the unit of scanning time is divided into two parts, one part is used for touch operation, and the other part is used for display scanning. For example, the driving device 2 is configured to provide a common voltage signal and a touch scanning signal. When the in-cell touch panel 1 performs the function of display, the common voltage signal given by the driving device 2 is transmitted to the common electrode via the transmission line, the common electrode is reused as a common electrode for display at this time; when the in-cell touch panel performs the function of touch control, the touch scanning signal provided by the driving device 2 is transmitted to the common electrode via the transmission line, the common electrode is reused as a touch electrode. For example, when a finger touches a capacitive touch screen, the capacitance from the finger is added to the capacitance of the touch electrode, so that the capacitance of the touch electrode changes, the touch detecting device 3 can detect the change in the capacitance before and after the touch, and the touch detecting device 3 receives a scanning result (information about the change in the capacitance) via the transmission line and then analyze and calculate the scanning result and convert the scanning result into the location coordinate of the touch point, and then send the location coordinate to the controller 4. In the case where the in-cell touch panel 1 is applied in a touch display device, for example, the controller 4 is a processor of the touch display device (for example, CPU, etc.), and the controller 4 can control operations of the driving device 2 at the same time.

In the display method provided by the embodiments of the present disclosure, the way of "time-sharing scanning" is adopted, the unit of scanning time is divided into two parts, one part is used for touch operation, and the other part is used for display scanning, so that the touch scanning and the display scanning do not interfere with each other, which can reduce or avoid the potential interference between the touch signal and a display signal. In this way, the common electrode 204 has two different functions, which is beneficial to achieving of a high integration degree, reducing the thickness of the whole touch substrate, and saving a cost.

What have been described above are only specific implementations of the present disclosure, the protection scope of the present disclosure is not limited thereto. The protection scope of the present disclosure should be based on the protection scope of the claims.

What is claimed is:
1. A touch substrate, comprising:
    a base substrate;
    a first insulation layer on the base substrate, wherein a groove extending in a first direction is in the first insulation layer;
    a transmission line in the groove and configured to transmit an electrical signal; and a common electrode overlapped with the transmission line and electrically connected with the transmission line, wherein in a direction perpendicular to the base substrate, the groove extends from an inside of the first insulation layer to a topmost surface, away from the base substrate, of the first insulation layer;

an opening, away from the base substrate, of the groove is flush with the topmost surface, away from the base substrate, of the first insulation layer;

in a direction parallel to the base substrate, a maximum size of the transmission line is smaller than a size of the opening, away from the base substrate, of the groove;

the common electrode comprises a first portion and a second portion, the first portion of the common electrode is provided inside the groove and covers a side surface of the groove and a bottom surface of the groove, the second portion of the common electrode is provided outside the groove and covers the topmost surface, away from the base substrate, of the first insulation layer;

the transmission line covers the first portion of the common electrode;

a topmost surface, away from the base substrate, of the transmission line and a topmost surface, away from the base substrate, of the second portion of the common electrode are substantially in a same plane in a direction parallel to the base substrate.

2. The touch substrate according to claim 1, further comprising:

a pixel electrode at a side, away from the base substrate, of the transmission line, wherein an end of the pixel electrode overlaps with at least a portion of the transmission line.

3. The touch substrate according to claim 1, further comprising a gate line and a data line intersecting with each other, wherein the transmission line is parallel to the gate line.

4. The touch substrate according to claim 2, further comprising:

a second insulation layer on the transmission line and the common electrode and covering the transmission line and the common electrode.

5. The touch substrate according to claim 4, wherein the pixel electrode is at a side, away from the base substrate, of the second insulation layer.

6. The touch substrate according to claim 2, further comprising:

a passivation layer at a side, away from the base substrate, of the pixel electrode and covering the whole base substrate.

7. An in-cell touch panel, comprising the touch substrate according to claim 1.

8. The in-cell touch panel according to claim 7, further comprising:

a touch detecting device electrically connected with the transmission line and configured to detect a position of a touch point; and a controller in signal connection with the touch detecting device and configured to receive a detecting result from the touch detecting device.

9. A manufacturing method of a touch substrate, comprising:

providing a base substrate;

forming a first insulation layer on the base substrate, wherein a groove extending in a first direction is provided in the first insulation layer;

forming a transmission line, wherein the transmission line is provided in the groove and is configured to transmit an electrical signal; and forming a common electrode, wherein the common electrode overlaps with the transmission line and is electrically connected with the transmission line, wherein in a direction perpendicular to the base substrate, the groove extends from an inside of the first insulation layer to a topmost surface, away from the base substrate, of the first insulation layer;

an opening, away from the base substrate, of the groove is flush with the topmost surface, away from the base substrate, of the first insulation layer;

in a direction parallel to the base substrate, a maximum size of the transmission line is smaller than a size of the opening, away from the base substrate, of the groove;

the common electrode comprises a first portion and a second portion, the first portion of the common electrode is provided inside the groove and covers a side surface of the groove and a bottom surface of the groove, the second portion of the common electrode is provided outside the groove and covers the topmost surface, away from the base substrate, of the first insulation layer;

the transmission line covers the first portion of the common electrode;

a topmost surface, away from the base substrate, of the transmission line and a topmost surface, away from the base substrate, of the second portion of the common electrode are substantially in a same plane in a direction parallel to the base substrate.

10. The manufacturing method according to claim 9, further comprising:

forming a pixel electrode at a side, away from the base substrate, of the transmission line, wherein an end of the pixel electrode overlaps with at least a portion of the transmission line.

11. A touch substrate, comprising:

a base substrate;

a first insulation layer on the base substrate, wherein a groove extending in a first direction is in the first insulation layer;

a transmission line in the groove and configured to transmit an electrical signal; and a common electrode overlapped with the transmission line and electrically connected with the transmission line, wherein in a direction perpendicular to the base substrate, the groove extends from an inside of the first insulation layer to a topmost surface, away from the base substrate, of the first insulation layer;

an opening, away from the base substrate, of the groove is flush with the topmost surface, away from the base substrate, of the first insulation layer;

in a direction parallel to the base substrate, a maximum size of the transmission line is smaller than a size of the opening, away from the base substrate, of the groove;

the groove is completely filled by the transmission line;

a topmost surface, away from the base substrate, of the transmission line and the topmost surface, away from the base substrate, of the first insulation layer are substantially in a same plane in a direction parallel to the base substrate;

the common electrode is provided outside the groove and covers the first insulation layer and the first transmission line;

a lowest surface, facing the base substrate of the common electrode is substantially in the same plane with the topmost surface, away from the base substrate, of the transmission line and the topmost surface, away from the base substrate, of the first insulation layer in the direction parallel to the base substrate.

12. The touch substrate according to claim 11, further comprising:
a pixel electrode at a side, away from the base substrate, of the transmission line, wherein an end of the pixel electrode overlaps with at least a portion of the transmission line.

13. The touch substrate according to claim 12, further comprising:
a second insulation layer at a side, away from the base substrate, of the common electrode and covering the common electrode.

14. The touch substrate according to claim 13, wherein the pixel electrode is at a side, away from the base substrate, of the second insulation layer.

15. The touch substrate according to claim 12, further comprising:
a passivation layer at a side, away from the base substrate, of the pixel electrode and covering the whole base substrate.

16. The touch substrate according to claim 11, further comprising a gate line and a data line intersecting with each other,
wherein the transmission line is parallel to the gate line.

* * * * *